(12) United States Patent
Coulson et al.

(10) Patent No.: US 9,182,859 B2
(45) Date of Patent: Nov. 10, 2015

(54) CAPACITIVE TOUCH PANEL WITH FORCE SENSING

(75) Inventors: Michael Paul Coulson, Oxford (GB); Christopher James Brown, Oxford (GB); Dauren Slamkul, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 399 days.

(21) Appl. No.: 13/597,950

(22) Filed: Aug. 29, 2012

(65) Prior Publication Data

US 2014/0062934 A1 Mar. 6, 2014

(51) Int. Cl.
*G06F 3/044* (2006.01)
*G06F 3/041* (2006.01)

(52) U.S. Cl.
CPC .............. *G06F 3/044* (2013.01); *G06F 3/0414* (2013.01); *G06F 2203/04105* (2013.01)

(58) Field of Classification Search
CPC ................................ G06F 3/44; G06F 3/0414
USPC ......................................................... 345/174
See application file for complete search history.

(56) References Cited

U.S. PATENT DOCUMENTS

| | | | |
|---|---|---|---|
| 4,293,734 A | 10/1981 | Pepper | |
| 5,543,591 A * | 8/1996 | Gillespie et al. | ........... 178/18.03 |
| 5,915,285 A | 6/1999 | Sommer | |
| 6,492,979 B1 | 12/2002 | Kent | |
| 7,538,760 B2 | 5/2009 | Hotelling | |
| 2007/0229464 A1* | 10/2007 | Hotelling et al. | ............. 345/173 |
| 2008/0007539 A1* | 1/2008 | Hotelling | ........................ 345/173 |
| 2008/0245582 A1* | 10/2008 | Bytheway | .................. 178/18.06 |
| 2008/0309633 A1* | 12/2008 | Hotelling et al. | ............. 345/173 |
| 2009/0085885 A1* | 4/2009 | Wu et al. | ........................ 345/173 |
| 2010/0110038 A1* | 5/2010 | Mo et al. | ........................ 345/174 |
| 2010/0253645 A1* | 10/2010 | Bolender | ....................... 345/174 |
| 2010/0253651 A1* | 10/2010 | Day | .............................. 345/175 |
| 2011/0007030 A1* | 1/2011 | Mo et al. | ........................ 345/174 |

OTHER PUBLICATIONS

U.S. Appl. No. 13/195,364, filed Aug. 2011, Coulson.

* cited by examiner

*Primary Examiner* — Dorothy Harris
(74) *Attorney, Agent, or Firm* — Renner, Otto, Boisselle & Sklar, LLP

(57) ABSTRACT

A capacitive type touch sensing device includes a first electrode array including a plurality of drive electrodes and a plurality of sense electrodes, and a second electrode array spaced apart from the first electrode array and including a plurality of discrete, electrically floating conductive regions. At least part of the second electrode array positionally overlaps with at least part of the first electrode array to define a separation distance therebetween, the separation distance varying with a force applied to a surface of the touch sensing device. Further, each conductive region is positioned relative to a respective drive electrode and sense electrode of the first electrode array so that a capacitance between certain pairs of drive and sense electrodes is more sensitive to a variation in the separation distance than a capacitance between other pairs of drive and sense electrodes.

18 Claims, 19 Drawing Sheets

CAPACITIVE TOUCH PANEL WITH FORCE SENSING

TECHNICAL FIELD AND APPLICATIONS OF THE INVENTION

The present invention relates to touch panel devices and, more particularly, to capacitive type touch panels. A capacitive type touch panel device may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is demonstrated in surface capacitive systems, for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When a conductive object, such as a human finger 13, comes into close proximity to the sensing electrode, a capacitor 14 is dynamically formed between the sensing electrode 11 and the finger 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels can be found in projected capacitive systems. In this method, as shown in FIG. 2, a drive electrode 20 and sense electrode 21 are formed on a transparent substrate (not shown). The drive electrode 20 is fed with a changing voltage or excitation signal by a voltage source 22. A signal is then induced on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When a conductive object such as a finger 13 is brought within close proximity of both electrodes, it forms a first dynamic capacitor to the drive electrode 27 and a second dynamic capacitor to the sense electrode 28. The effect of these dynamically formed capacitances is manifested as a reduction of the amount of capacitive coupling in between the drive and sense electrodes and hence a reduction in the magnitude of the signal measured by the current measurement means 24 attached to the sense electrode 21. As is well-known, by arranging a plurality of drive and sense electrodes in an array, such as a two-dimensional matrix array, this projected capacitance sensing method may be used to form a touch panel device. An advantage of the projected capacitance sensing method over the surface capacitance method is that multiple simultaneous touch input events may be detected. However, in spite of the multi-touch capabilities of the projected capacitive method, it has some significant limitations. For example, it cannot be used to detect the force of touch input and is unable to detect touch input from non-conductive objects such as a plastic stylus or pen.

In order to overcome these limitations, hybrid systems incorporating force sensing devices into projected capacitive touch panels have been proposed. For example, "Metal-polymer composite with nanostructured filler particles and amplified physical properties", Applied Physics Letters 88, 102013 (2006), discloses a force sensitive material which may be used to form a ring around the periphery of the touch panel. Alternatively, U.S. Pat. No. 6,492,979 (Kent, Dec. 10, 2002) describes a touch panel system incorporating discrete force sensing devices. A force sensor may also be formed in the touch sensor electrode layer: for example, U.S. Pat. No. 5,915,285 (Sommer, Jun. 22, 1999) describes strain gauges formed from Indium Tin Oxide, and inter-digitated amongst the touch sensor electrodes. However, these systems are limited in that they cannot individually measure multiple forces applied at different points.

A method of simultaneously measuring multiple separate touches, together with their associated forces, is proposed in U.S. Pat. No. 7,538,760 (Hotelling, May 26, 2009). This patent describes compressible structures of capacitive sensor electrodes, such as that shown in FIG. 3. The structure of FIG. 3 employs a layer of projected capacitive sense electrodes 410 and a first set of drive electrodes 420 to determine the location of each touch, in the manner of a conventional projected capacitive touch sensor. These sense electrodes 410 and drive electrodes 420 are formed on opposite sides of a sensor substrate 430. A spring structure 440 separates the sense electrodes 410 from a second set of drive electrodes 450. A protective cosmetic layer 460 lies on top of the first set of drive electrodes, and the entire sensor structure is supported by a support substrate 470. The force applied to a point on the sensor influences the local compression of the spring structure, and therefore changes the local capacitance measured between the sense electrodes 410 and the second set of drive electrodes 450. This local capacitance is indicative of the local touch force. Although such a device may permit measurement of both touch position and touch force, it requires the addition of the patterned drive layer 450, to which electrical connections must be provided, incurring a significant extra manufacturing cost. Furthermore, several upper layers must be deformed in order to compress the spring structure 440. This limits the device's sensitivity, spatial resolution and mechanical robustness.

An alternative means of providing multi-touch force sensitivity is described in U.S. application Ser. No. 13/195,364 filed on Aug. 1, 2011. An additional substrate having a resistive layer is placed above a conventional capacitive sensor, spaced from the sensor by an elastic medium. The capacitive sensor is typically operated at two different frequencies. At the higher frequency, the resistive layer has little effect on the measured capacitances, and the sensor measures touch as per usual. At the lower frequency, however, conduction occurs within the resistive layer and so its compression towards the sensor substrate influences the measured capacitance.

Although this device is able to measure multiple simultaneous applied forces and does not require an electrical connection to the additional substrate, it does require a controller circuit that can stimulate and measure the response of the sensor at multiple frequencies. This increases the complexity of the circuit and may reduce the accuracy of the sensor and introduce unwanted co-dependencies between the force and touch measurement results.

A touch sensor device that overcomes the aforementioned problems and provides measurements of force without reducing the accuracy of the touch measurement or significantly increasing the complexity or cost of the device is therefore sought.

SUMMARY OF THE INVENTION

A capacitive touch sensing device in accordance with the present invention includes a means of detecting the force applied by objects touching the surface of the device. The device is capable of simultaneously detecting the proximity of multiple objects close to its surface—the touch sensing function—and the force applied by multiple objects in contact with the surface—the force sensing function.

The touch sensing device includes a first array of drive and sense electrodes and a second array of conductive regions which is arranged above the first array and separated from it by a gap. The conductive regions may be electrically floating and arranged with respect to the first array such that they form parallel plate capacitances to areas of the electrodes of the first array. These parallel plate capacitances result in an increase in the capacitance measured between certain drive and sense electrodes of the first array. The extent to which the capacitance is increased depends on the change in the gap between the first array and the second array, which in turn depends on applied touch forces.

In a first mode of operation using a first combination of drive and sense electrodes, the touch sensing device may provide a measurement of the proximity of a conductive and grounded object above the second array. This first measurement—the touch measurement—may be used to detect the location of objects touching the surface of the device. In a second mode of operation using a second combination of drive and sense electrodes, the touch sensing device may provide a measurement of the gap between the first array and the second array. This second measurement—the force measurement—may be used to provide information about the force applied by objects touching the surface of the device The capacitive touch sensing device in accordance with the present invention overcomes the aforementioned limitations of current touch sensing devices. Firstly, as no electrical connection need be made to the second array, additional cost and complexity is minimised. Secondly, as the additional electrode layer resides near the top of the device structure, the lower layers of the structure need not be deformed upon application of an external touch force. This improves spatial resolution, sensitivity, and mechanical robustness. Furthermore, the new sensor structure is compatible with conventional controller circuits.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF REFERENCE NUMERALS

Figure 1:
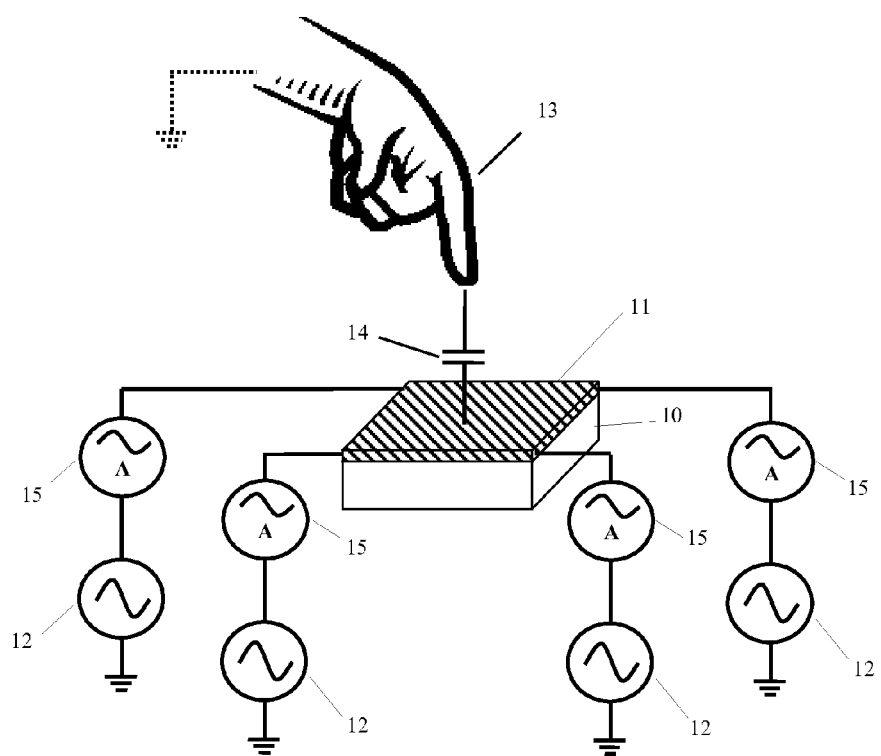
FIG. 1 shows a conventional implementation of a surface capacitance type touch panel.
Figure 2:
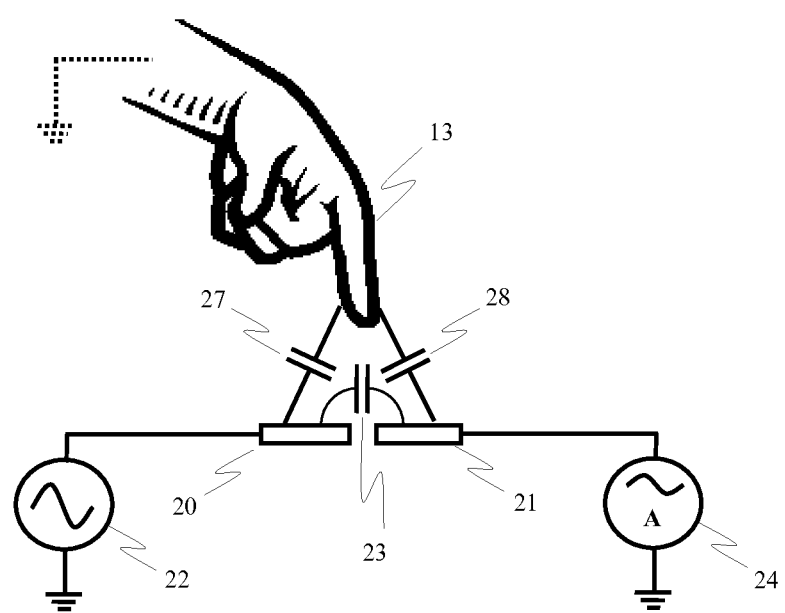
FIG. 2 shows a conventional implementation of a mutual capacitance type touch panel.
Figure 3:
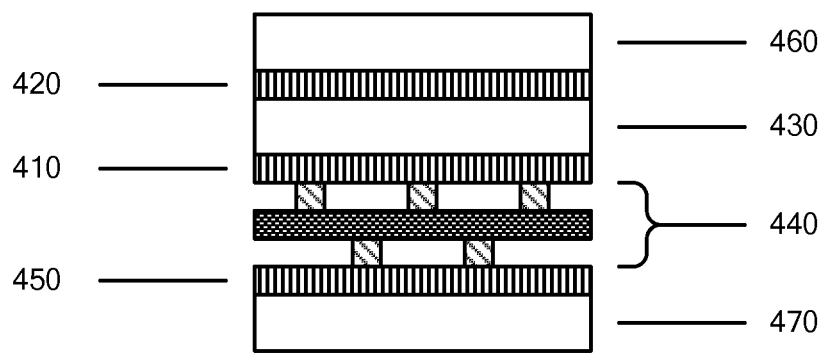
FIG. 3 shows a conventional compressible structure of capacitive sensor electrodes.

10 Transparent substrate
11 Sensing electrode
12 Voltage source
13 Conductive object
14 Capacitor
15 Current sensor
20 Drive electrode
21 Sense electrode
22 Voltage source
23 Mutual coupling capacitor
24 Current measurement means 27 Drive electrode
28 Sense electrode
410 Projected capacitive sense electrodes
420 First set of drive electrodes
430 Sensor substrate
440 Spring structure
450 Second set of drive electrodes
460 Protective cosmetic layer
470 Support substrate
605 Sensor substrate
608 First electrode layer
610 Drive electrodes
615 Sense electrodes
620 Additional electrode layer
625 Flexible support substrate
630 Deformable medium
635 Base support substrate
710 Drive electrodes
720 Sense electrodes
730 Region surrounding crossing point between particular drive and sense electrodes
740 Multiplexer
750 Multiplexer
760 Sensing circuit
770 ADC
780 Touch processor
790 Function generator
792 Operational amplifier
793 Integration capacitor
794 Reset switch
795 Input switch S1
796 Input switch S2
902 Conductive regions
905 Odd numbered sense electrode
906 Odd numbered sense electrode
907 Even numbered sense electrode
1010 Drive electrode
1020 Odd numbered sense electrode
1030 Even numbered sense electrode
1035 Fringing capacitance
1050 First parallel plate coupling capacitance
1060 Second parallel plate coupling capacitance
1210 First section of the sense electrodes
1220 Second section of the sense electrodes
1310 First section of the drive electrodes
1320 Second section of the drive electrodes
1410 First ring section of the sense electrode
1420 Second centre section of the sense electrode
1610 Fringing capacitance

DETAILED DESCRIPTION OF INVENTION

Figure 4:
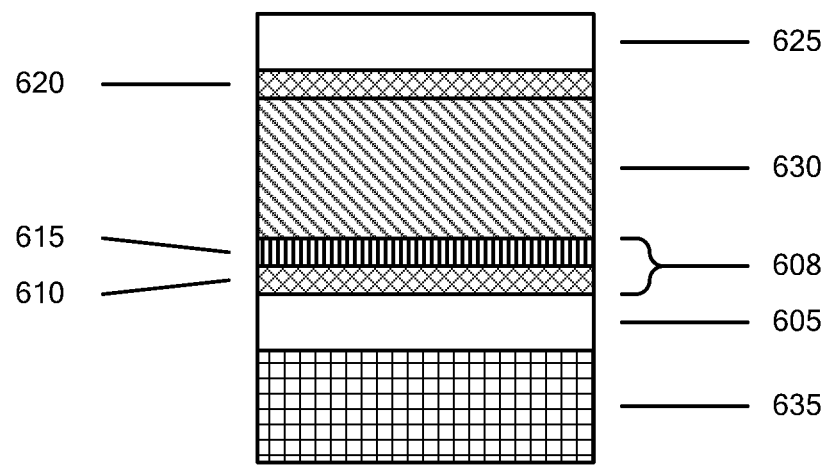
FIG. 4 shows an exemplary layer structure corresponding to a first embodiment of the present invention.

A touch sensing device in accordance with a first embodiment of the present invention is shown in FIG. 4. A first electrode array comprising drive electrodes 610 and sense electrodes 615 is formed in first electrode layer 608 on a first sensor substrate 605. The drive and sense electrodes are electrically insulated from one another, and may be similar to those found in a conventional projected capacitance touch sensor. A second electrode array of electrically separate conductive regions is formed in a second electrode layer 620 on a second substrate 625. The second electrode layer 620 is separated from the first electrode layer 608 by a deformable medium 630. The first array and second array may be formed, for example, by patterning a layer of transparent conductive material—such as indium tin oxide (ITO) or the like—using standard photolithographic or printing processes. The first sensor substrate and second substrate 625 may be made of a transparent material such as, for example, glass or plastic. The second substrate 625 may be flexible such that its surface deforms upon application of a force to any point on its surface. The entire sensor structure is supported by a base support substrate 635, which may be the surface of an information display panel.

Figure 5:
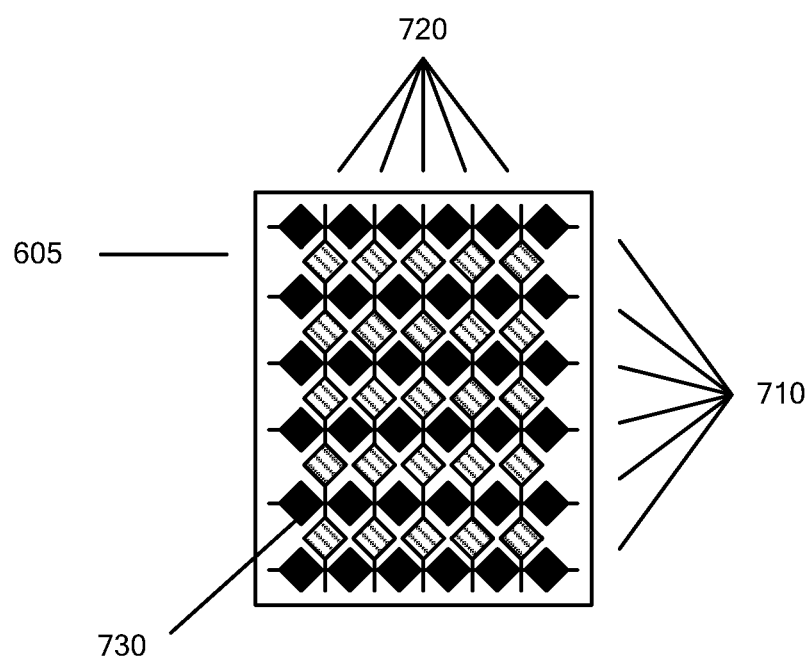
FIG. 5 shows an exemplary electrode pattern for a first electrode array in accordance with the first embodiment of the invention.

An exemplary arrangement of drive and sense electrodes on the first sensor substrate is shown in FIG. 5 which shows a plan view of the first sensor substrate 605 with drive electrodes 710 and sense electrodes 720. The drive electrodes 710 are patterned into a series of interconnecting diamond shapes in a first direction, and the sense electrodes 720 are patterned into a series of interconnecting diamond shapes in a second direction. The second direction is orthogonal to the first direction and the diamond shapes of the drive electrodes tessellate with the diamond shapes of the sense electrodes. It is well-known to pattern the drive electrodes 710 and the sense electrodes 720 into diamond shapes in order to maximize the signal caused by an approaching object whilst minimizing the area of overlap between the drive and sense electrodes that contributes to the baseline signal (that is, an offset signal that is insensitive to an approaching object). However, this pattern of drive and sense electrodes is intended to be exemplary and any tessellating pattern may be used instead. A region 730 corresponding to the intersection of one particular drive electrode with one particular sense electrode is highlighted.

As used herein, a single sensor location of the sensor array is defined by part of a drive electrode, part of a first sense electrode and part of a second sense electrode each adjacent to the part of the drive electrode, and one or more conductive regions adjacent to and positionally overlapping with the part of the drive electrode and the part of the first sense electrode, and positionally overlapping to a lesser extent with the part of the second sense electrode.

Figure 6:
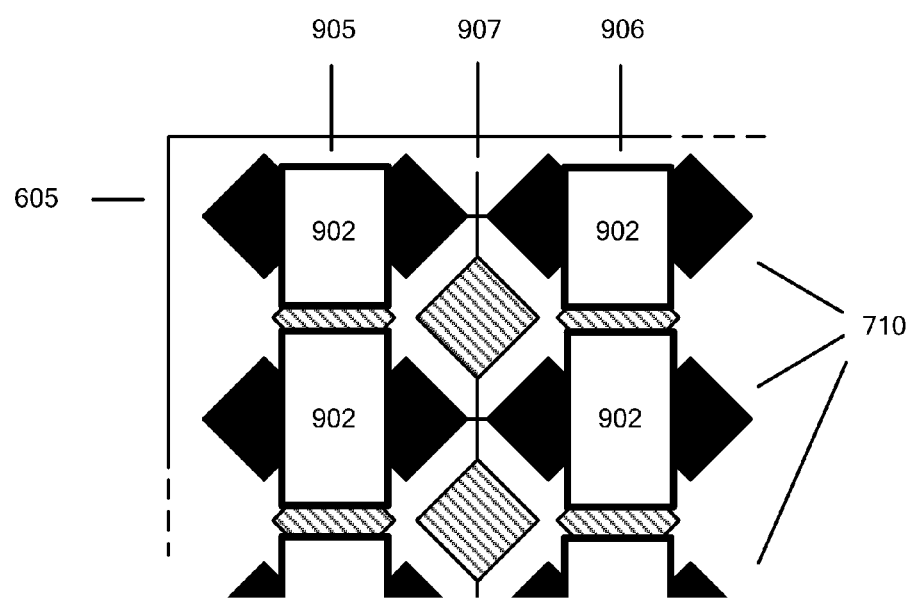
FIG. 6 shows conductive regions defined on a second electrode layer in accordance with the first embodiment of the invention.

FIG. 6 is a plan view of part of the sensor substrate, which shows the outline of the conductive regions 902. In this first embodiment, the conductive regions 902 are positioned to overlap at least partially the drive electrodes 710, to overlap at least partially the odd numbered sense electrodes 905 and 906, but not to overlap the even numbered sense electrodes 907. The mutual coupling capacitance that is measured between any particular drive electrode 710 and an even numbered sense electrode 907 is therefore relatively independent of the presence of the additional electrode layer 620. The coupling capacitance is thus relatively insensitive to the separation between the first electrode layer and the second electrode layer and may be used to provide a touch measurement. However, the mutual coupling capacitance between any particular drive electrode 710 and an odd numbered sense electrode 905 includes the parallel plate capacitances formed between the drive electrode 710 and the conductive regions 902 and between the sense electrode 905 and the conductive regions 902. The mutual coupling capacitance in this case is thus relatively sensitive to the separation between the first electrode layer and the second electrode layer and may be used to provide a force measurement. In this context, the terms 'relatively sensitive' and 'relatively insensitive' mean that the force sensitivity of the mutual coupling capacitance between the drive electrode 710 and the odd numbered sense electrode 905 is greater than that of the mutual coupling capacitance between the drive electrode 710 and the even numbered sense electrode 907.

Figure 7:
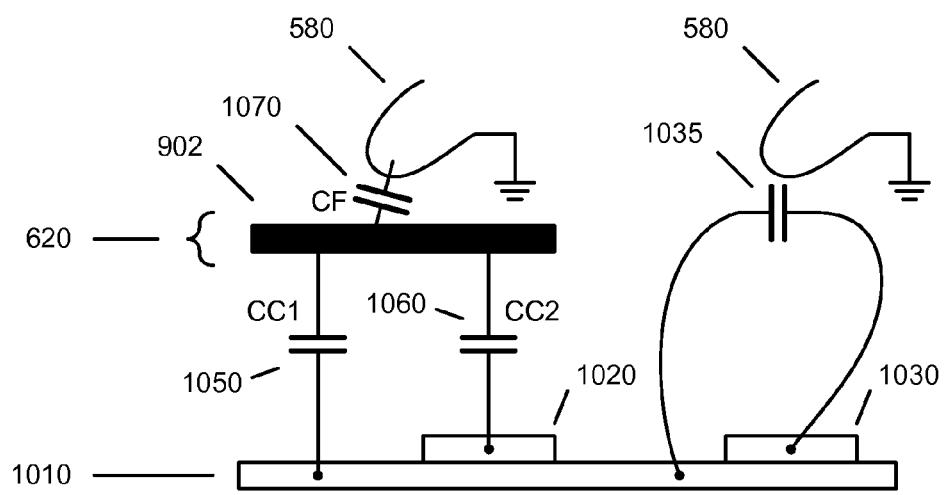
FIG. 7 shows an exemplary sensor substrate and external components in accordance with the first embodiment of the invention.

FIG. 7 shows a simplified equivalent circuit that relates to the region 730 where a particular drive electrode 1010 is crossed by a particular odd numbered sense electrode 1020 and a particular neighbouring even numbered sense electrode

1030. The operation of this simplified equivalent circuit is now described in detail. The even numbered sense electrode 1030 and the drive electrode 1010 are capacitively coupled by a fringing capacitance 1035 that is not affected by the second electrode layer 620 and is modified by the presence of a grounded conductive object 580. Therefore, by measuring changes in the capacitance between the drive electrode 1010 and the even numbered sense electrode 1030, it is possible to detect the presence of a grounded conductive object above the sensor.

The odd numbered sense electrode 1020 and the drive electrode 1010 both form parallel plate capacitances to the conductive region 902 formed in the second electrode layer 620. They are therefore effectively connected by two series capacitances: the first parallel plate coupling capacitance CC1 1050 and the second parallel plate coupling capacitance CC2 1060. These capacitances increase when the distance between the second electrode layer 620 and first electrode layer is decreased. By measuring the capacitance between the drive electrode 1010 and the odd numbered sense electrode 1020 it is therefore possible to detect forces applied to the surface of the touch sensor.

Figure 8:
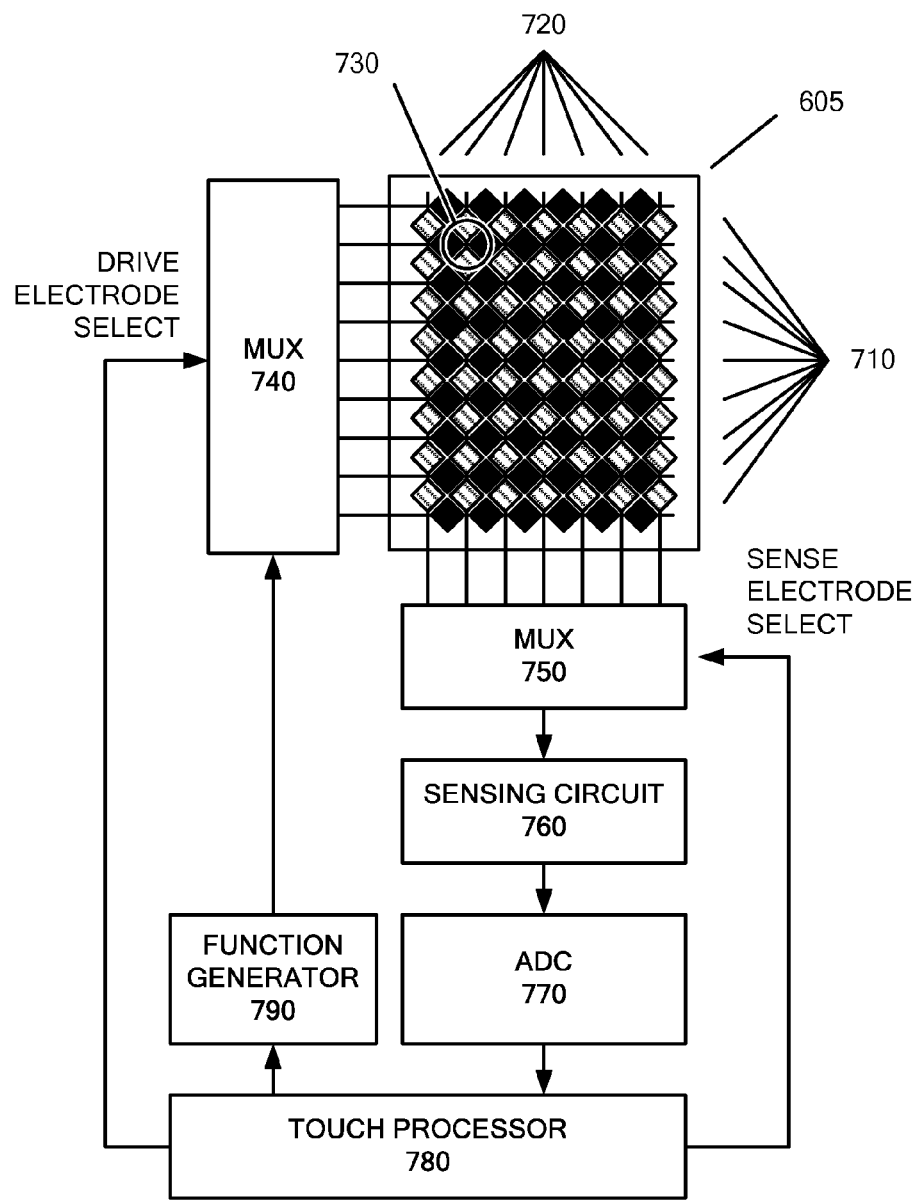
FIG. 8 shows one possible form of a sensing circuit that finds use in the first embodiment of the invention.

The operation of the sensing device is now described with reference to the block diagram of FIG. 8. A voltage stimulus is generated by a function generator 790, under the control of a touch processor 780, and applied to each of the drive electrodes 710 in turn. The voltage stimulus may be any periodic signal, for example, a sinusoid, ramp, saw-tooth or train of square pulse waveforms. The function generator 790 is connected to one drive electrode at a time by the multiplexer 740. At any given time, one of the sense electrodes 720 is connected by the multiplexer 750 to the sensing circuit 760. The analogue output of the sensing circuit 760 is converted to a digital quantity by the ADC 770, and this digital quantity is received by the touch processor 780.

Figure 9:
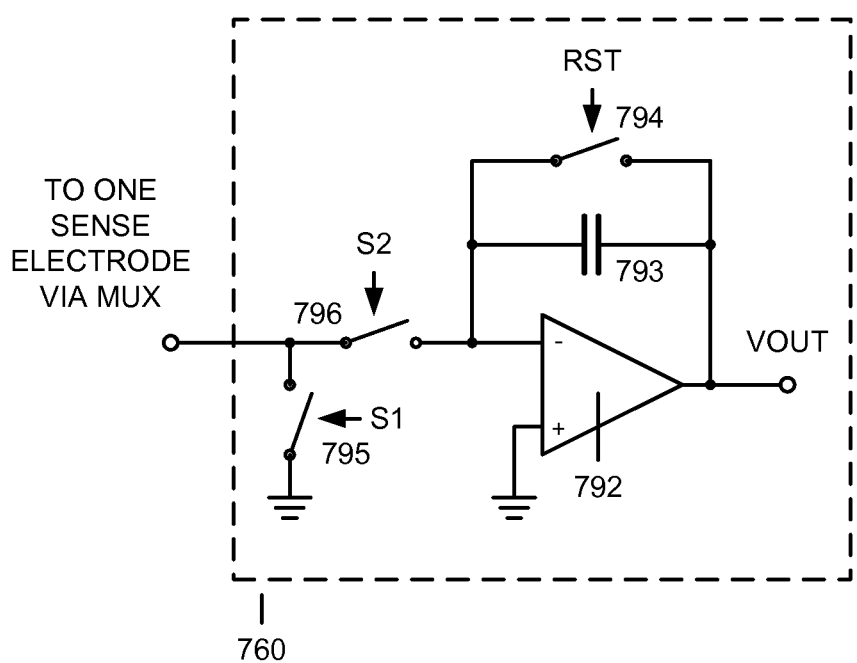
FIG. 9 shows a schematic diagram of an exemplary sensor circuit that finds use in the first embodiment of the invention.

The sensing circuit 760 measures the current that flows from the connected sense electrode and may also maintain that sense electrode at a constant voltage during this measurement. The sensing circuit 760 may, for example, take the form of a charge integrator circuit, as shown in FIG. 9. The charge integrator circuit of FIG. 9 comprises an operational amplifier 792, an integration capacitor 793 and a reset switch 794. The charge integrator circuit additionally has input switches 795 and 796, which may be operated so as to accumulate charge onto the integration capacitor 793 over the course of multiple periods of the voltage stimulus applied to the drive electrode. This improves the signal-to-noise ratio (SNR) of the measurement. The final amount of charge accumulated on the integration capacitor 793 is indicative of the mutual capacitance between the stimulated drive electrode and the sense electrode being measured. The use of a charge integrator as the sensing circuit is intended to be exemplary and other known circuits and techniques for current measurement may be used instead.

Figure 10:
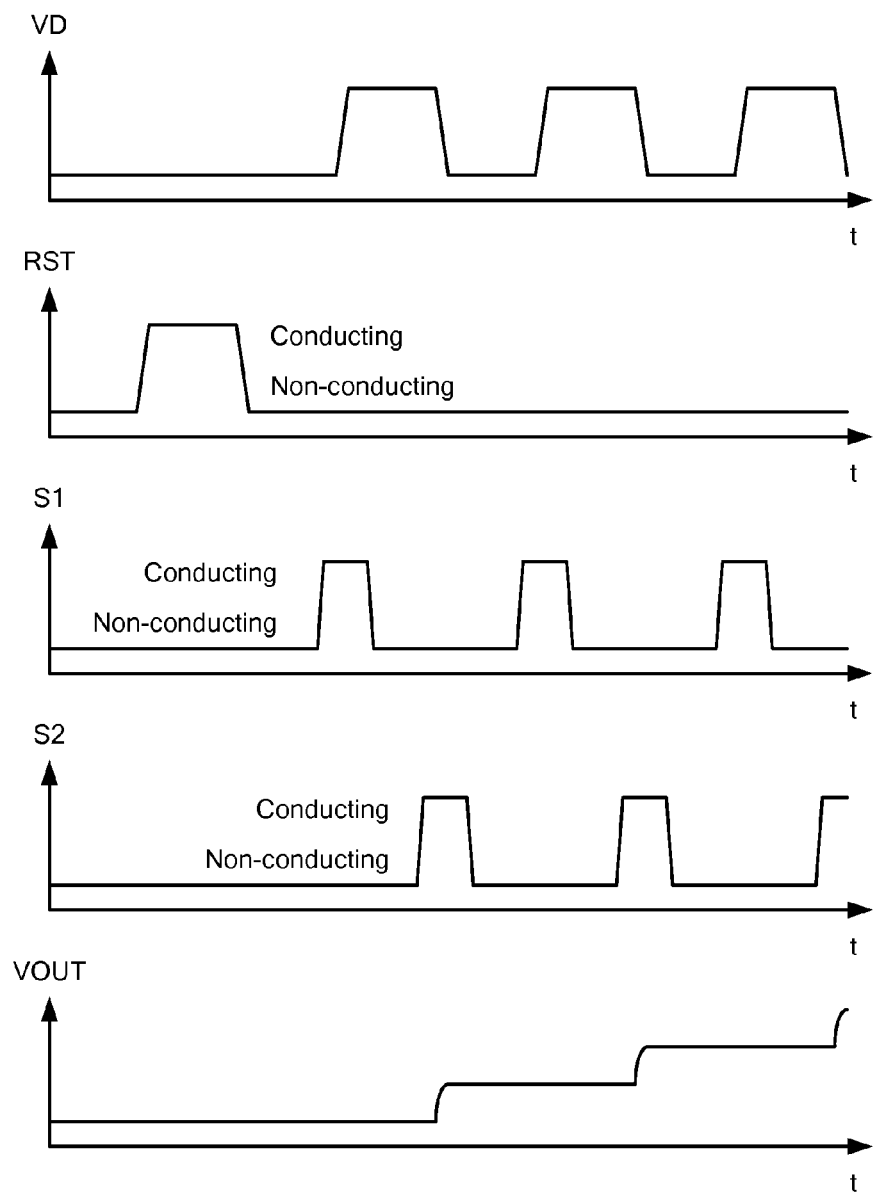
FIG. 10 shows a set of signal timings that may be used to operate a charge integrator circuit, together with the typical output voltage waveform of the circuit.

The detailed operation of the sensing circuit 760, shown in FIG. 9, is now described with reference to the waveform diagram of FIG. 10. FIG. 10 shows the timing signals S1, S2 and RST, together with the voltage stimulus VD applied to one of the drive electrodes, and the output voltage of the circuit, VOUT. The RST switch 794 is firstly made to conduct, so that the output voltage VOUT is initialized to a known, fixed voltage. The input switch S1 795 then conducts to maintain the connected sense electrode at ground during the rising edge of the first drive voltage pulse. The input switch S1 795 then becomes non-conducting, and the input switch S2 796 becomes conducting to allow charge to accumulate on the integration capacitor 792 during the falling edge of the first drive voltage pulse. This causes the output voltage of the charge integrator circuit to rise by an amount that corresponds to the capacitance between the stimulated drive electrodes and the connected sense electrode. The alternate operation of switches S1 and S2 may be repeated many times (for example 20 times) in order to accumulate charge from multiple drive voltage pulses, in order to improve the SNR of the measurement, as previously described. The final voltage at the output of the sensing circuit 760 is then indicative of the mutual capacitance between the stimulated drive electrodes, and the connected sense electrode.

Figure 11:
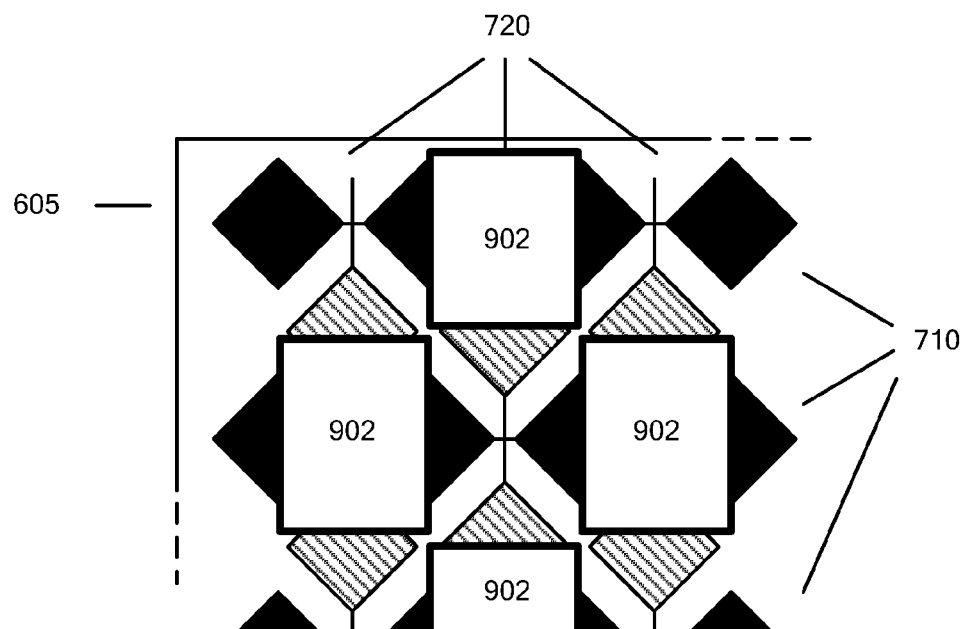
FIG. 11 shows conductive regions defined on an additional electrode layer, above every other intersection of drive and sense electrodes.

In the present embodiment, the floating conductive islands are positioned above certain sense electrodes but not above others. However, it is not necessary to allocate the floating conductive islands on an electrode-by-electrode basis; an alternative is to distribute the conductive regions of the additional electrode layer 620 on an intersection-by-intersection basis. Such an arrangement is illustrated FIG. 11 which shows a plan view of a sensor substrate, wherein conductive regions 902 are patterned and aligned across every other intersection of the drive electrodes 710 and the sense electrodes 720. This creates 'force sensing intersections', which have conductive regions on the additional electrode layer 620 above, and 'touch sensing intersections', which do not have conductive regions on the additional electrode layer 620 above.

It is noted that an undesirable feature of the device arises at the force sensing intersections since the floating conductive region 902 may capacitively couple to a grounded conductive object in proximity to the region. The presence of the grounded conductive object may therefore reduce the effective coupling capacitance measured between the drive electrode 1010 and the relevant sense electrode. This means that the presence of the grounded conductive object may have significant influence upon the force measurement. In order to improve the accuracy of the force measurement, the touch processor unit 780 may therefore include a means of extracting an accurate force measurement from the raw measurement results of the touch sensing intersections and force sensing intersections. A method of combining these raw measurements to improve the accuracy of the force measurement is now explained in detail.

Let the change in the capacitance measured between a drive electrode and a sense electrode, at a force sensing intersection, be known as the force signal DCF. Likewise, let the change in the capacitance measured between a drive electrode and a sense electrode, at an adjacent touch sensing intersection, be known as the touch signal DCT.

Because the force signal DCF reflects the presence of grounded conductive objects, as does the touch signal DCT, the force signal may be approximated as a mathematical function, such that DCF=g(F, DCT), where F is the applied force. In order to determine the applied force, it is necessary to solve this function for F, given the measured values of DCF and DCT. To this end, the mathematical function g may be determined through simulation or measurement following design of the touch sensing device. For example, the quantities DCF and DCT may be measured whilst various known forces are applied using objects of different conductivities. Subsequently, during normal operation of the sensor, measured values of DCF and DCT may be used to solve g for F, using a well-known iterative process such as the Newton-Raphson method.

A limitation of this method however is that it relies upon the adjacent touch sensing intersections and force sensing intersections experiencing both similar forces and similar electrical influence from any touching object. This may only be true when the pitch of the electrode pattern is small compared to the dimensions of the object.

Figure 12:
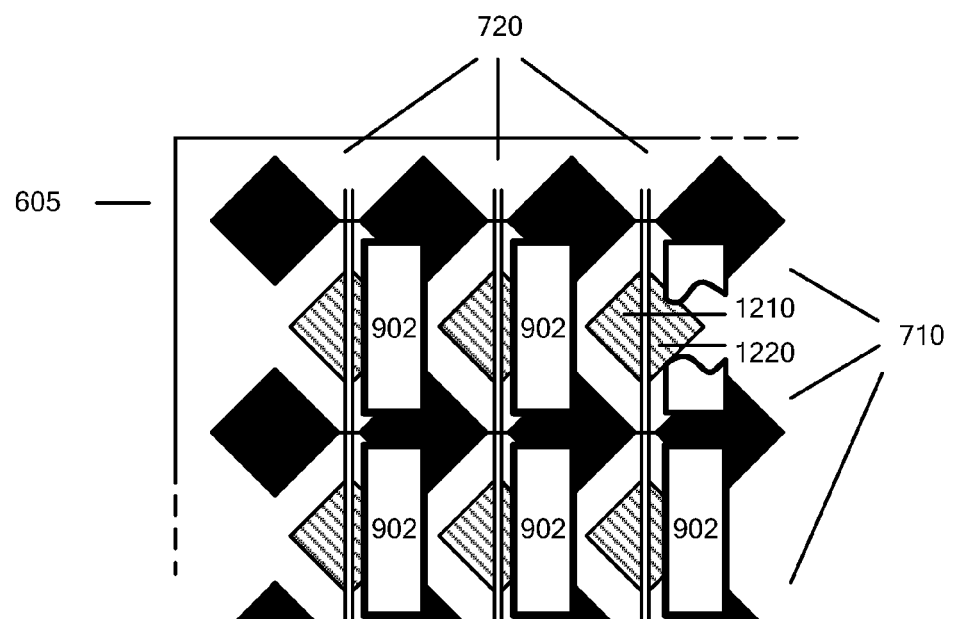
FIG. 12 shows conductive regions defined on the additional electrode layer, above one part of each split sense electrode.

In a touch sensing device in accordance with a second embodiment of the invention each sense electrode in the first electrode array is symmetrically divided along its principal direction into a first sense electrode section and a second sense electrode section. The conductive regions of the second electrode array are patterned and aligned so as to overlap at least partially the drive electrodes, to overlap at least partially the first sense electrode section of a sense electrode, but not to overlap the second sense electrode section. FIG. 12 shows a plan view the first substrate 605 illustrating an exemplary arrangement of the first electrode array with a diamond patterned sense electrode divided into two sense electrode sections. Also shown is the second electrode array of conductive regions 902 formed in the second electrode layer on the second substrate (not shown for clarity). Here the first sense electrode section 1210 does not lie beneath the conductive regions 902, yet the second sense electrode section 1220 does. As before, the device may be operated by application of a periodic voltage stimulus to each drive electrode 710 in turn whilst simultaneously measuring the current that flows from both the first sense electrode section 1210 and the second sense electrode section 1220. Since the density of touch sensing intersections and force sensing intersections is doubled in the present embodiment with respect to the previous, the touch sensing and force sensing intersections are brought very close to one another and therefore experience similar forces and similar electrical influence from any touching object. The accuracy of the force measurement may therefore be improved.

However, twice as many sense channels are now required in order to measure the quantities DCF and DCT from the two intersections associated with each position on the touch sensor substrate. This is undesirable since more connections must be made to the first electrode array and this may lead to an increase in the cost, complexity and size of the touch sensing device.

Figure 13:
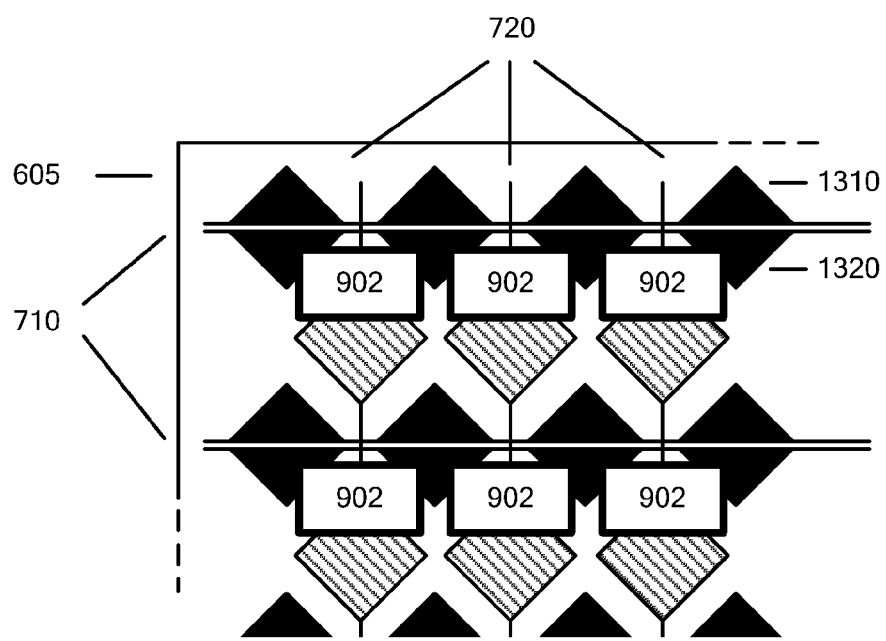
FIG. 13 shows conductive regions defined on the additional electrode layer, above one part of each split drive electrode.

In a third embodiment, each drive electrode of the first electrode array is symmetrically divided along its principal direction into a first drive electrode section and a second drive electrode section. FIG. 13 shows a plan view of the first substrate 605 illustrating an exemplary arrangement of the first electrode array with a diamond patterned drive electrode divided into two drive electrode sections. Also shown is the second electrode array of conductive regions 902 formed in the second electrode layer on the second substrate (not shown for clarity). Here, the first drive electrode section 1310 of the drive electrodes 710 does not lie beneath the electrically floating conductive regions 902, yet the second drive electrode section 1320 does. The device may be operated by application of a periodic voltage stimulus to each section of each drive electrode 710 in turn, whilst simultaneously measuring the current that flows from each sense electrode 720. This embodiment may be advantageous over the second embodiment, in that fewer current measurement circuits are required. However, since there are twice as many drive electrode sections in the present embodiment as drive electrodes in the previous embodiment, twice as many signals must be sequentially applied in order to measure the entire electrode array. Consequently, a touch sensing device in accordance with the present embodiment may be restricted to operate with a lower frame-rate than the previous embodiments.

As previously described, in the aforementioned embodiments measurement results from adjacent force sensing intersections and touch sensing intersections may be combined to provide a more accurate measure of the applied force that is independent of the presence of a grounded conductive object.

It is therefore beneficial that the intersections should experience both similar forces and similar electrical influence from any touching object. However, although the second and third embodiments place the force sensing intersections and the touch sensing intersections in close proximity to one another, their centroids are still at different positions on the sensor substrate. This means that their proximity to the force or touch event will be slightly mismatched, which may compromise the accuracy with which the actual applied force, F, may be determined.

Figure 14:
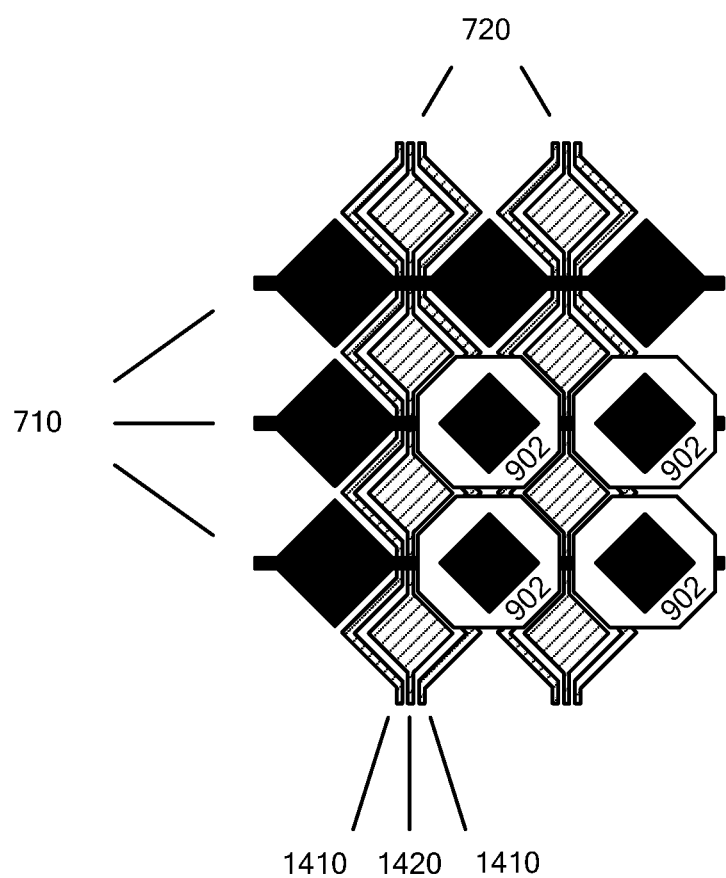
FIG. 14 shows conductive regions defined on the additional electrode layer, above the outer part of each split sense electrode.

In a fourth embodiment of the present invention, the sense electrodes are divided into two sections that share a common geometric centroid. FIG. 14 is a plan view of an exemplary first and second electrode array in accordance with the present embodiment. Here, the sense electrodes 720 are divided into a first ring section 1410 and a second centre section 1420. The first ring section 1410 is arranged symmetrically around the second centre section 1420 such that the two sections share a common centroid. Floating conductive regions 902, formed in the second electrode layer on the second substrate, are patterned so as to overlap at least partially the drive electrodes 710, overlap at least partially the ring section 1410 of a sense electrode but not to overlap the centre section 1420 of a sense electrode. The ring section 1410 of the sense electrode therefore forms the force sensing intersection with the drive electrode, and the centre section 1420 of the sense electrode forms the touch sensing intersection with the drive electrode.

The sensor may be operated as previously described by application of a periodic voltage stimulus to each drive electrode 710 in turn and simultaneously measuring the currents that flow from the first ring section 1410 and from the second centre section 1420. An advantage of the shared common centroid of the two sections is that the distance from any touching object to the centre of both sections will be similar and both sense electrode sections will therefore experience similar electrical influence from the object. Consequently, the force measurement may be more accurately calculated from the raw measurements of the touch sensing intersections and force sensing intersections in the manner previously described.

Figure 15:
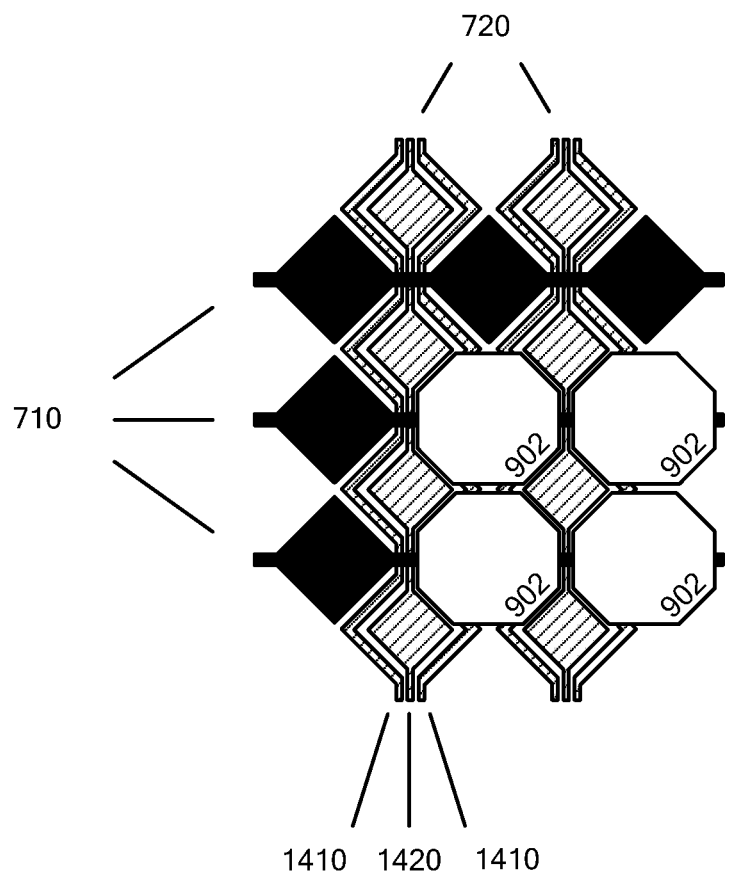
FIG. 15 shows conductive regions defined on the additional electrode layer, above the outer part of each split sense electrode, and fully covering each drive electrode.
Figure 16:
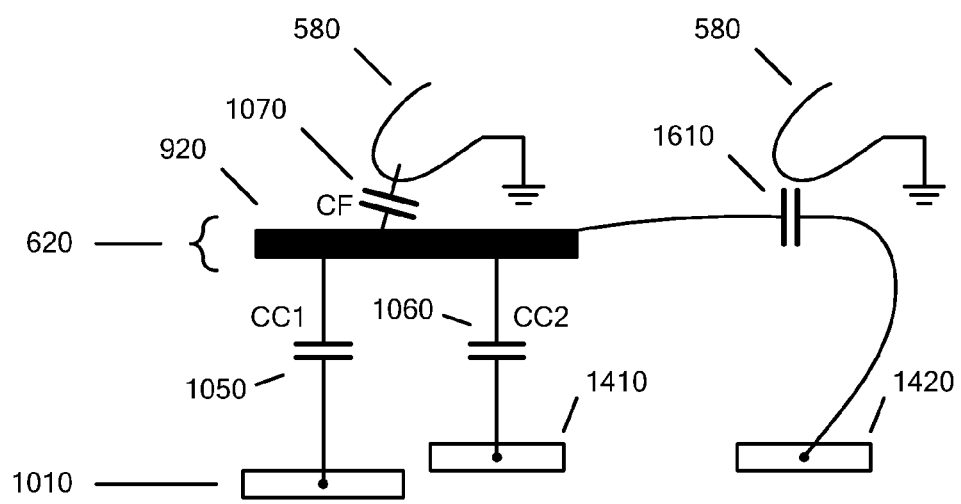
FIG. 16 shows an equivalent circuit for the electrode geometry of FIG. 15.

In an alternative arrangement, the conductive regions 902 may overlap the entire area of the drive electrode, as shown in FIG. 15. An equivalent circuit for this case is given in FIG. 16. Despite the conductive region 902 covering the entire drive electrode, the sensor is still able to detect the presence of grounded conductive objects, because a large proportion of the voltage stimulus applied to the drive electrodes will appear on the conductive region 902, and will couple to the centre section 1420 of the sense electrode via the fringing capacitance 1610. It is this fringing capacitance 1610 that is disturbed by the presence of a grounded conductive object 580.

In this present embodiment, the second centre section 1420 of each sense electrode forms the touch sensing intersection with the drive electrode, and the first ring section 1410 of each sense electrode forms the force sensing intersection with the drive electrode. However, the centre section is relatively distant from each drive electrode 710. A disadvantage of this arrangement is therefore that the fringing capacitance 1610 will be small which may result in a small touch signal and lead to a decreased SNR and a reduced accuracy of the touch sensing device.

Figure 17:
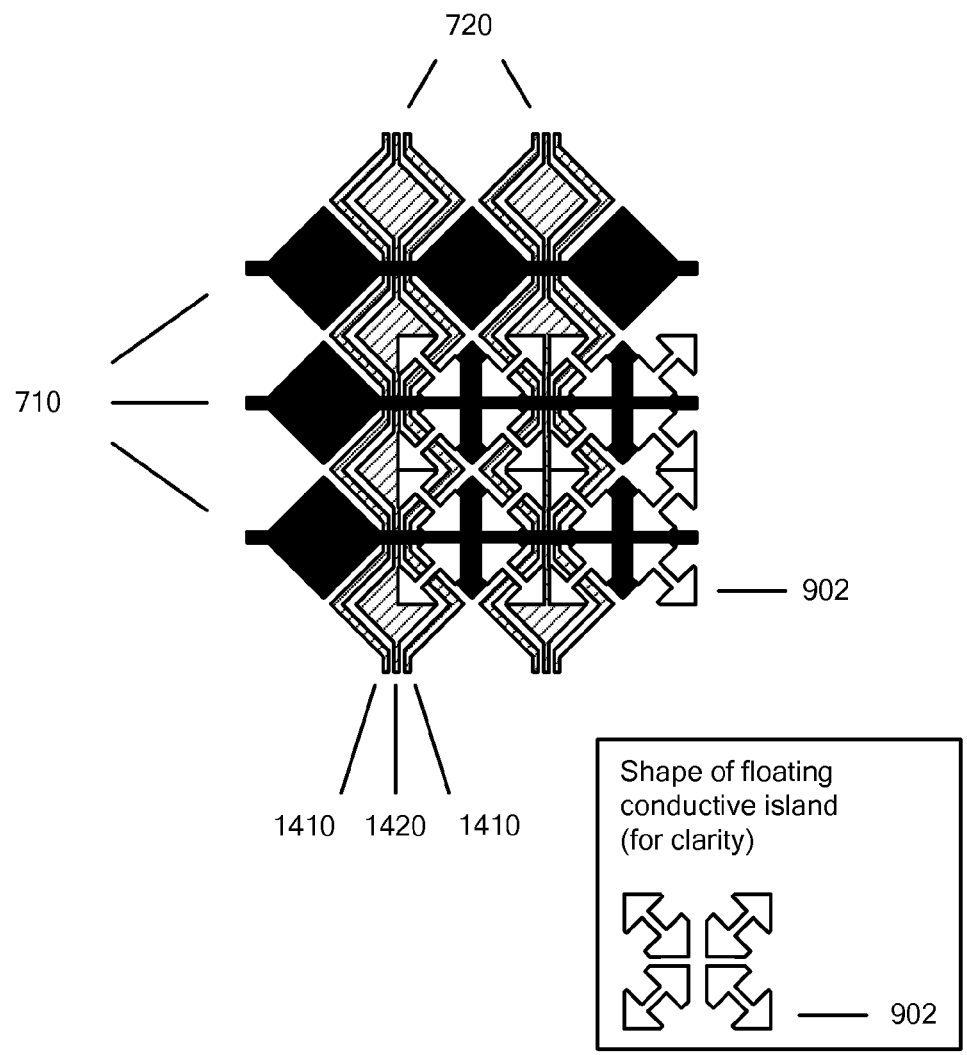
FIG. 17 shows conductive regions defined on the additional electrode layer, above the inner part of each split sense electrode.

In a fifth embodiment, shown in FIG. 17, the conductive regions 902 are arranged to overlap at least partially a drive electrode 710 and to overlap at least partially the second centre section 1420 of a sense electrode. The area of overlap between the conductive regions 902 and the first ring section 1410 of a sense electrode is minimized. For clarity, four separate conductive regions 902 associated with one intersection of drive electrode and sense electrode are shown separately. The centre section 1420 of the sense electrode therefore forms the force sensing intersection with the drive electrode, and the ring section 1410 of the sense electrode forms the touch sensing intersection with the drive electrode. This may be advantageous over the previous embodiment, as the fringing capacitance between the drive electrode and the ring section 1410 of the sense electrode is relatively large, so the touch signal may be improved.

In the aforementioned embodiments, it is possible to solve an approximated function DCF=g(F, DCT) for F, in order to determine a value of the applied force that is independent of the electrical influence of a grounded conductive object. However, if the dependence of DCF upon DCT varies with the location of the touching object, relative to the intersection concerned, the accuracy of the force measurement may be poor. This may be true even when the force and touch sensing intersections share a common centroid.

A sixth embodiment uses any one of the electrode geometries described in the previous embodiments. In the sixth embodiment, the dependence of the force signal DCF upon the touch signal DCT may be approximated as a more complex mathematical function, such that DCF=h(F, DCT, x, y), where x and y are the co-ordinates of force or touch event, relative to the intersection concerned, in the plane of the sensor substrate. The function h(F, DCT, x, y) may be determined through simulation or measurement following design of the sensor, for example by applying various known forces at different positions, using objects of different conductivities, whilst measuring DCF and DCT.

Figure 18:
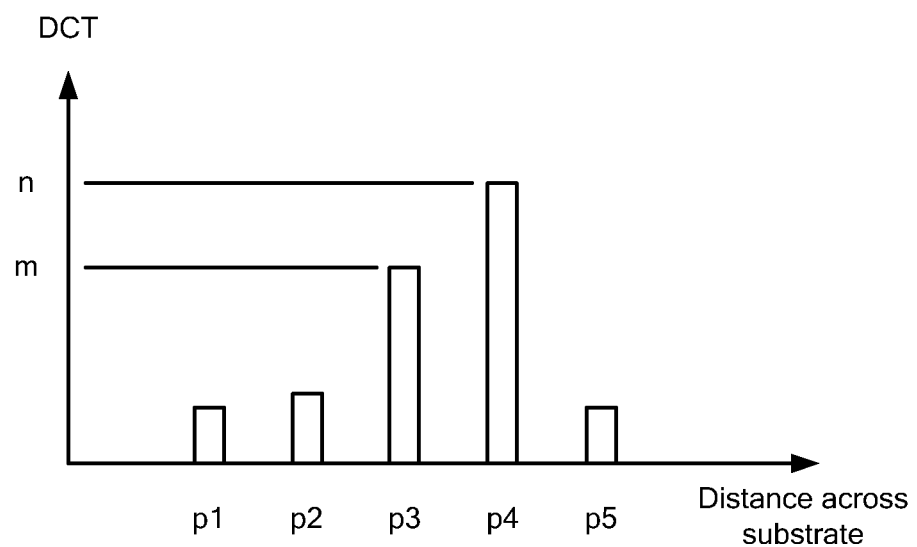
FIG. 18 shows a possible distribution of the touch signal, DCT, at five distances across the sensor substrate.

During normal operation of the sensor, the function DCF=h(F, DCT, x, y) may be solved for F, given measured values of DCF, DCT and estimated values of x and y. The solution may be performed using a well-known iterative process such as the Newton-Raphson method. The estimated values of x and y may be obtained by estimating the position of the maximum of either the touch signal DCT or the force signal DCF. Estimation of the position of a maximum is a well-known technique, employed within conventional touch sensor systems to determine touch location at a resolution finer than the pitch of the electrodes themselves. One possible method involves using data from the two intersections which return the greatest measurement results. For example, FIG. 18 shows the value of DCT measured from five adjacent intersections, at distances along the sensor substrate of p1, p2, p3, p4 and p5. The intersections at positions p3 and p4 measure the greatest values, these values being m and n respectively. An estimate of the position of the maximum may be obtained by performing a weighted summation of the distances along the substrate, according to the values m and n, for example p3*(m/[m+n])+p4*(n/[m+n]).

In the preceding embodiments, the second electrode layer was formed by a transparent conductive material, such as indium tin oxide (ITO), and patterned into discrete conductive regions. However, a disadvantage of the discrete conductive regions is that they may cause visual artefacts to be perceived on the surface of the touch panel, for example as caused by differences in the reflection of ambient light from the surface. In accordance with a seventh embodiment of the present invention the second electrode layer 620 is formed by a continuous and transparent film of semiconductor material, for example a transparent oxide semiconductor such as Indium-Gallium-Zinc-Oxide (IGZO) or the like. The film of transparent semiconductor may be deposited onto the second substrate as an intrinsic type (i.e. un-doped or lightly doped) material so that its electrical resistance is high. Subsequently, in order to form the aforementioned discrete conductive regions, the transparent semiconductor material may be doped to form either n-type or p-type material with increased conductivity. The doping process may use conventional photolithography techniques to define areas, i.e. the conductive regions, where high conductivity is required. Since the second electrode layer is now continuous no visual artefacts will be perceived.

Figure 19:
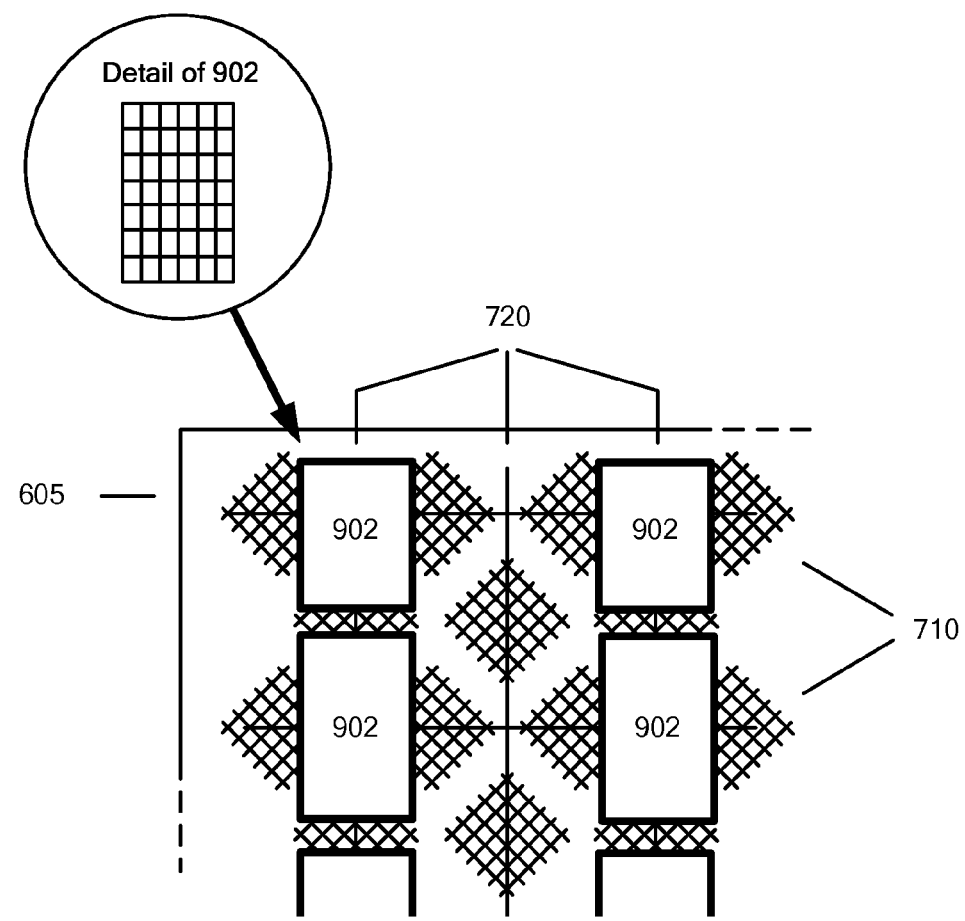
FIG. 19 shows an another embodiment, wherein the shapes of the various electrodes are formed from networks of thin metal tracks.

In the preceding embodiments, each electrode is formed from a transparent conductive material such as ITO. However, the electrodes may equally be formed from metal, for example copper or silver. In accordance with an eighth embodiment of the present invention, the additional electrode layer 620, the drive electrodes 610 and the sense electrodes 615 are not formed from a transparent conductive material but are instead formed from a network of thin metal tracks. The metal tracks may be used to define the outline and fill pattern of the drive and sense electrodes. For example, FIG. 19 shows one possible way of defining electrode shapes using a network of thin metal tracks. Typical materials for the metal tracks include copper and silver, whilst the typical width of the tracks is 10 um, and the typical thickness of the metal layer is 10 um. An advantage of the eighth embodiment is that the cost of a touch sensing device using a mesh of metal tracks for the electrode array may be lower than the cost of a similar device using transparent conducting materials. Further, the resistance of drive and sense electrodes formed by a mesh of metal tracks may be reduced compared to similar electrodes formed by transparent conducting materials. This may allow the frequency of the periodic voltage stimulus applied to the drive electrodes to be increased thus increasing the SNR—and hence the accuracy—or the frame rate of the touch sensing device.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The invention finds application in touch sensor panels, and touch sensitive display panels, for industrial and consumer electronics. It is ideally suited to products such as mobile phones, tablet computers and 'e-readers'.

What is claimed is:

1. A capacitive type touch sensing device, comprising:
   a first electrode array of electrode elements formed on a substrate, each electrode element including a drive electrode portion and a sense electrode portion; and
   a second electrode array spaced apart from the first electrode array and including a plurality of discrete, electrically floating conductive regions,
   wherein at least part of the second electrode array positionally overlaps with at least part of the first electrode array to define a separation distance therebetween, the separation distance varying with a force applied to a surface of the touch sensing device, and at least one of the drive electrode portion or the sense electrode portion of each electrode element is symmetrically divided into a pair of electrode sections, and
   wherein each electrically floating conductive region is positioned relative to a respective electrode element of the first electrode array so that a capacitance between certain pairs of drive and sense electrode sections is more sensitive to a variation in the separation distance than a capacitance between other pairs of drive and sense electrode sections.

2. The touch sensing device according to claim 1, further comprising:
   a first substrate including a first electrode layer;
   a second substrate including a second electrode layer; and
   a deformable medium arranged between the first substrate and the second substrate, wherein the drive electrodes and the sense electrodes are formed in the first electrode layer and the electrically floating conductive regions are formed in the second electrode layer.

3. The touch sensing device according to claim 2, wherein the first electrode layer and the second electrode layer are formed from a transparent conductive material.

4. The touch sensing device according to claim 2, wherein the second electrode layer is formed from a transparent film of semiconductor material.

5. The touch sensing device according to claim 2, wherein the drive electrodes, the sense electrodes, and the second electrode layer are formed from a network of metal tracks.

6. The touch sensing device according to claim 1, wherein the drive electrodes are patterned into a series of interconnecting diamond shapes in a first direction, and the sense electrodes are patterned into a series of interconnecting diamond shapes in a second direction.

7. The touch sensing device according to claim 6, wherein the first direction is orthogonal to the second direction.

8. The touch sensing device according to claim 1, wherein the drive electrodes tessellate with the sense electrodes.

9. The touch sensing device according to claim 1, wherein the electrically floating conductive regions are positioned to at least partially overlap with the drive electrodes, at least partially overlap with odd numbered sense electrodes, and not overlap with even numbered sense electrodes.

10. The touch sensing device according to claim 1, wherein the pairs of the electrode sections include a first sense electrode section and a second sense electrode section, and the electrically floating conductive regions are arranged to at least partially overlap with the drive electrodes and the first sense electrode section, and not overlap with the second sense electrode section.

11. The touch sensing device according to claim 1, wherein the pairs of the electrode sections include a first drive electrode section and a second drive electrode section,
   the first drive electrode section does not positionally overlap with the electrically floating conductive regions, and
   at least part of the second drive electrode section positionally overlaps with at least part of the electrically floating conductive regions.

12. The touch sensing device according to claim 1, wherein the sense electrodes are divided into two sections that share a common geometric centroid.

13. The touch sensing device according to claim 12, wherein each sense electrode is divided into a first ring section and a second center section, the first ring section arranged symmetrically around the second center section.

14. The touch sensing device according to claim 13, wherein the electrically floating conductive regions are patterned to at least partially overlap the drive electrodes and the first ring section, and not overlap the second center section.

15. The touch sensing device according to claim 13, where the electrically floating conductive regions overlap the entire drive electrode.

16. The touch sensing device according to claim 13, wherein the electrically floating conductive regions are arranged to at least partially overlap the drive electrodes and the second center section.

17. The touch sensing device according to claim 1, further comprising circuitry operatively coupled to the drive electrodes and the sense electrodes, the circuitry configured to:
   determine a location on the touch sensing device at which an object touches a surface of the touch sensing device; and
   determine a force applied at the determined location.

18. The touch sensing device according to claim 17, wherein the circuitry comprises a processor configured to:
   sequentially apply a stimulus signal to each drive electrode;
   sequentially connect each sense electrode to measurement circuitry to measure a signal on each sense electrode, said signal generated in response to an object touching a surface of the touch sensing device and creating capacitive coupling between a stimulated drive electrode and a connected sense electrode; and
   calculate a location of the object touching the surface and a force applied at the location based on the signal measured from each sense electrode.

* * * * *